United States Patent [19]

Stevens, III

[11] Patent Number: 5,838,798
[45] Date of Patent: Nov. 17, 1998

[54] RESTAURANT TRANSACTION PROCESSING SYSTEM AND METHOD

[75] Inventor: Harden E. Stevens, III, Lexington, S.C.

[73] Assignee: NCR Corporation, Dayton, Ohio

[21] Appl. No.: 597,726

[22] Filed: Feb. 7, 1996

[51] Int. Cl.⁶ .................................. H04L 9/00; E04H 3/04
[52] U.S. Cl. .................................. 380/49; 705/15; 186/39
[58] Field of Search .............................. 380/49; 455/462, 455/465; 235/383, 375; 186/39; 705/15, 21

[56] References Cited

U.S. PATENT DOCUMENTS

| | | | |
|---|---|---|---|
| 3,886,302 | 5/1975 | Kosco | 178/5.1 |
| 4,251,865 | 2/1981 | Moore et al. | 364/200 |
| 4,367,485 | 1/1983 | Hemmie | 358/86 |
| 4,388,689 | 6/1983 | Hayman et al. | 705/15 |
| 4,456,793 | 6/1984 | Baker et al. | 179/99 R |
| 4,530,067 | 7/1985 | Dorr | 705/15 |
| 4,553,222 | 11/1985 | Kurland et al. | 705/15 |
| 4,569,421 | 2/1986 | Sandstedt | 186/39 |
| 4,625,274 | 11/1986 | Schroeder | 364/200 |
| 4,661,659 | 4/1987 | Nishimura | 379/61 |
| 4,742,352 | 5/1988 | Ishii | 340/825.47 |
| 4,779,138 | 10/1988 | Nomura et al. | 358/236 |
| 4,850,009 | 7/1989 | Zook et al. | 379/96 |
| 4,916,441 | 4/1990 | Gombrich | 340/712 |
| 4,935,720 | 6/1990 | Kalfoun | 186/38 |
| 4,959,686 | 9/1990 | Spallone et al. | 364/401 |
| 4,972,457 | 11/1990 | O'Sullivan | 379/59 |
| 4,992,940 | 2/1991 | Dworkin | 364/401 |
| 5,003,472 | 3/1991 | Perrill et al. | 705/15 |
| 5,023,905 | 6/1991 | Wells et al. | 379/96 |
| 5,031,098 | 7/1991 | Miller et al. | 705/21 |
| 5,043,721 | 8/1991 | May | 340/825.44 |
| 5,079,628 | 1/1992 | Tomikawa | 358/86 |
| 5,189,632 | 2/1993 | Paajanen et al. | 364/705.05 |
| 5,202,825 | 4/1993 | Miller et al. | 705/21 |
| 5,210,785 | 5/1993 | Sato et al. | 455/522 |
| 5,249,044 | 9/1993 | Von Kohorn | 358/86 |
| 5,259,021 | 11/1993 | Antilla et al. | 379/61 |
| 5,302,947 | 4/1994 | Fuller et al. | 340/825.34 |
| 5,305,206 | 4/1994 | Inoue et al. | 364/419.1 |
| 5,310,997 | 5/1994 | Roach et al. | 235/375 |
| 5,422,934 | 6/1995 | Massa | 379/61 |
| 5,487,175 | 1/1996 | Bayley et al. | 455/54.2 |
| 5,500,888 | 3/1996 | Chiu et al. | 379/61 |
| 5,550,895 | 8/1996 | Burson et al. | 379/59 |
| 5,566,226 | 10/1996 | Mizoguchi et al. | 455/558 |
| 5,570,367 | 10/1996 | Ayanoglu et al. | 370/94.1 |
| 5,572,575 | 11/1996 | Yamamoto et al. | 379/61 |
| 5,572,653 | 11/1996 | DeTemple et al. | 395/501 |
| 5,590,406 | 12/1996 | Bayley et al. | 455/54.2 |
| 5,594,777 | 1/1997 | Makkonen et al. | 379/58 |
| 5,600,707 | 2/1997 | Miller, III | 379/59 |
| 5,602,854 | 2/1997 | Luse et al. | 370/313 |
| 5,608,606 | 3/1997 | Blaney | 361/686 |
| 5,610,910 | 3/1997 | Focsaneanu et al. | 370/351 |
| 5,628,055 | 5/1997 | Stein | 455/89 |
| 5,633,920 | 5/1997 | Kikinis et al. | 379/130 |
| 5,640,002 | 6/1997 | Ruppert et al. | 235/472 |
| 5,659,890 | 8/1997 | Hidaka | 455/575 |
| 5,666,530 | 9/1997 | Clark et al. | 707/21 |
| 5,671,267 | 9/1997 | August et al. | 379/61 |

*Primary Examiner*—Elizabeth L. Dougherty
*Assistant Examiner*—Paul D. Amrozowicz
*Attorney, Agent, or Firm*—Paul W. Martin; Peter H. Priest

[57] ABSTRACT

A restaurant transaction processing system which employs low-cost cordless phone transceivers to transmit orders. A server includes a first cordless telephone transceiver. A portable computer includes a second cordless telephone transceiver and transfers order data to the first computer. The first and second cordless telephone transceivers preferably operate at frequencies designated by the FCC and have a transmission range less than five thousand feet. A typical frequency of operation is in a frequency band near 900 MHz. The system may also include a kitchen terminal which is coupled to the server through a network, and a transaction processing terminal which is also coupled to the server through the network. The server maintains transaction data, routes orders to the kitchen terminal, and routes order ready signals from the kitchen terminal to the portable computer. The transaction processing terminal completes payment for the orders.

13 Claims, 4 Drawing Sheets

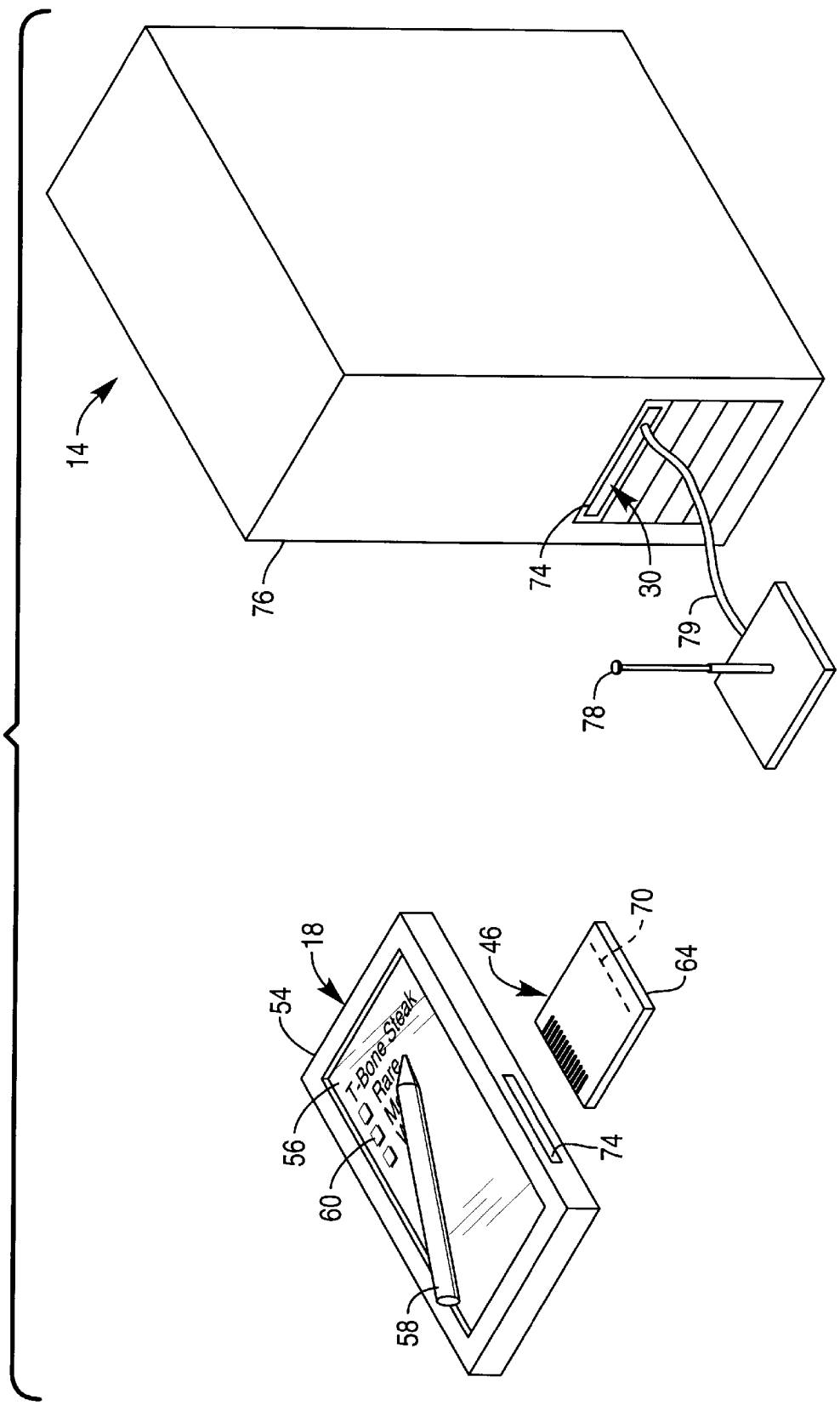

RESTAURANT TRANSACTION PROCESSING SYSTEM AND METHOD

CROSS-REFERENCE TO RELATED APPLICATIONS

The present invention is related to the following commonly assigned and co-pending U.S. applications:

"Short Range Wireless Portable Computing Device and Method", filed Feb. 7, 1996, invented by Stevens, and having a serial number 08/597,725.

"Broadcast Information System and Method", filed Feb. 7, 1996, invented by Stevens, and having a Ser. No. 08/597,727;

"Shopping System", filed Feb. 7, 1996, invented by Stevens, and having a Ser. No. 08/597,728; and "Instruction Communication System", filed Feb. 7, 1996, invented by Stevens, and having a Ser. No. 08/597,729, now U.S. Pat. No. 5,769,643.

BACKGROUND OF THE INVENTION

The present invention relates to restaurants, computer networks, and portable computers, and more specifically to a restaurant transaction processing system and method.

In typical restaurants, orders are recorded on a paper check and hand-carried back to the kitchen by a waiter. The waiter periodically visits the kitchen to determine whether the order is complete. This method is inefficient and time-consuming.

Some restaurants use walky-talkies to communicate orders to kitchen areas. Orders must still be entered manually in a terminal device.

Notebook computers and portable computing devices have been known to wirelessly communicate with host computer systems in many ways. Cellular and RF modems provide a wireless communication connection that relies on an external phone network. Wireless network systems provide an inoffice alternative to cable connections. Finally, very short range infra-red line of sight systems provide a simple method of coupling a notebook computer to a host system primarily for file transfer purposes. One disadvantage with these devices is that they are ill-suited for portable operation.

Therefore, it would be desirable to provide a restaurant transaction processing system and method which employ short range wireless portable computer devices to record and transmit orders, thereby speeding up food ordering, food delivery, and payment processing.

SUMMARY OF THE INVENTION

In accordance with the teachings of the present invention, a restaurant transaction processing system and method are provided. The restaurant transaction processing system employs low-cost cordless phone transceivers to transmit orders. A server includes a first cordless telephone transceiver. A portable computer includes a second cordless telephone transceiver and transfers order data to the first computer. The cordless telephone transceivers preferably operate at frequencies currently designated by the FCC under Part 15 for this type of function or in the Instrumentation, Scientific and Medical (ISM) band or at bands designated as unlicensed bands or in private bands. The term "cordless" is herein defined to exclude "cellular" telephones, which operate at higher powers requiring licenses and at different frequencies designated by the FCC. The transceivers adhere to FCC transmission protocols required for each band and have a practical transmission range less than five thousand feet. A typical frequency of operation is in a frequency band near 900 MHz.

The system may also include a kitchen terminal which is coupled to the server through a network, and a transaction processing terminal which is also coupled to the server through the network. The server maintains transaction data, routes orders to the kitchen terminal, and routes order ready signals from the kitchen terminal to the portable computer. The transaction processing terminal completes payment for the orders.

It is accordingly an object of the present invention to provide a restaurant transaction processing system and method.

It is another object of the present invention to provide a restaurant transaction processing system and method which includes portable computing devices and cordless telephone transceivers for wirelessly transmitting orders.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

FIG. 2 is a perspective view of a wireless portable computing device and a server within the system of FIGS. 1A–1B.

DETAILED DESCRIPTION OF THE PREFERRED EMBODIMENTS

Figure 1A:
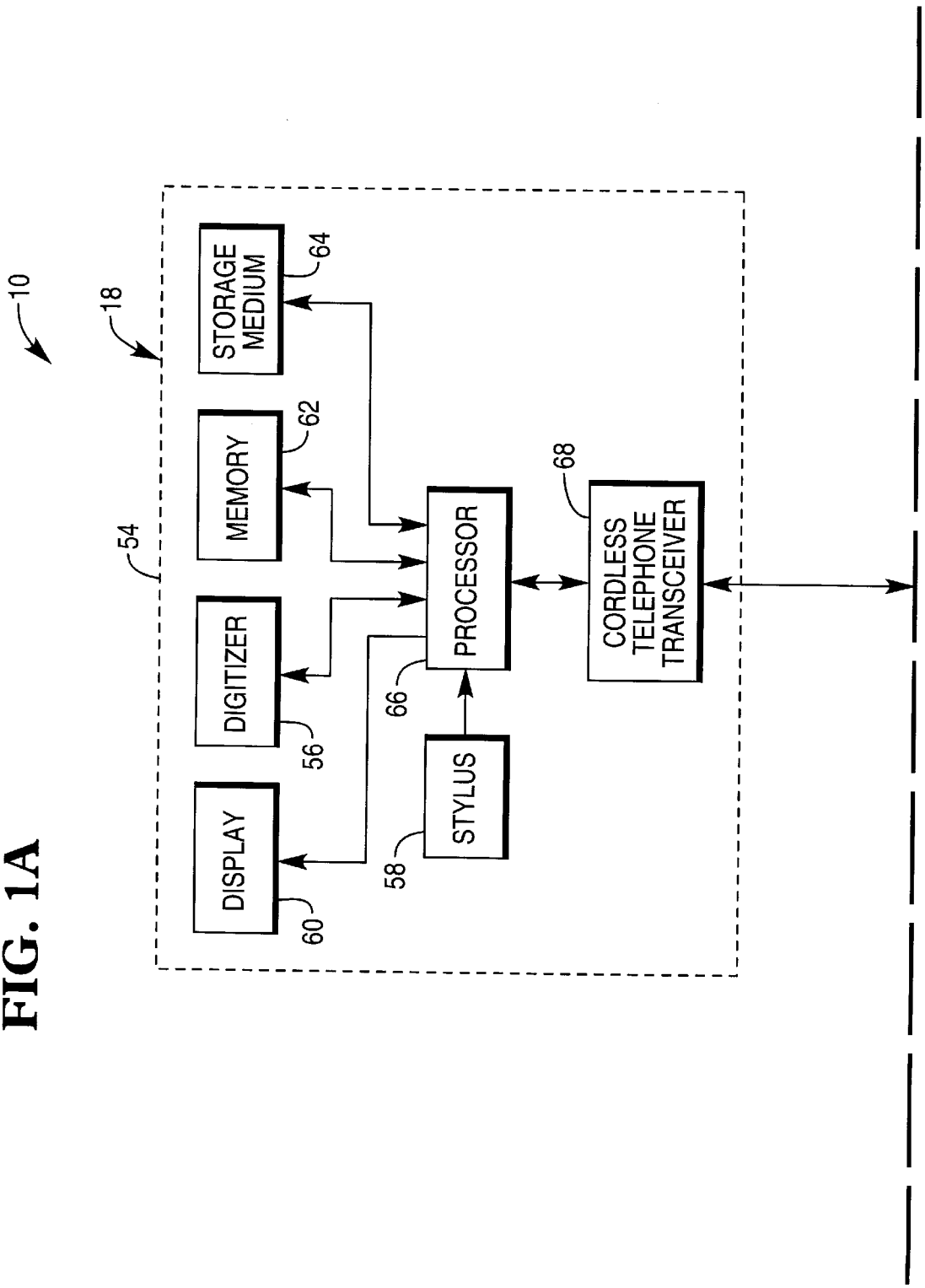
FIGS. 1A and 1B form a block diagram of the restaurant transaction processing system of the present invention.
Figure 1B:
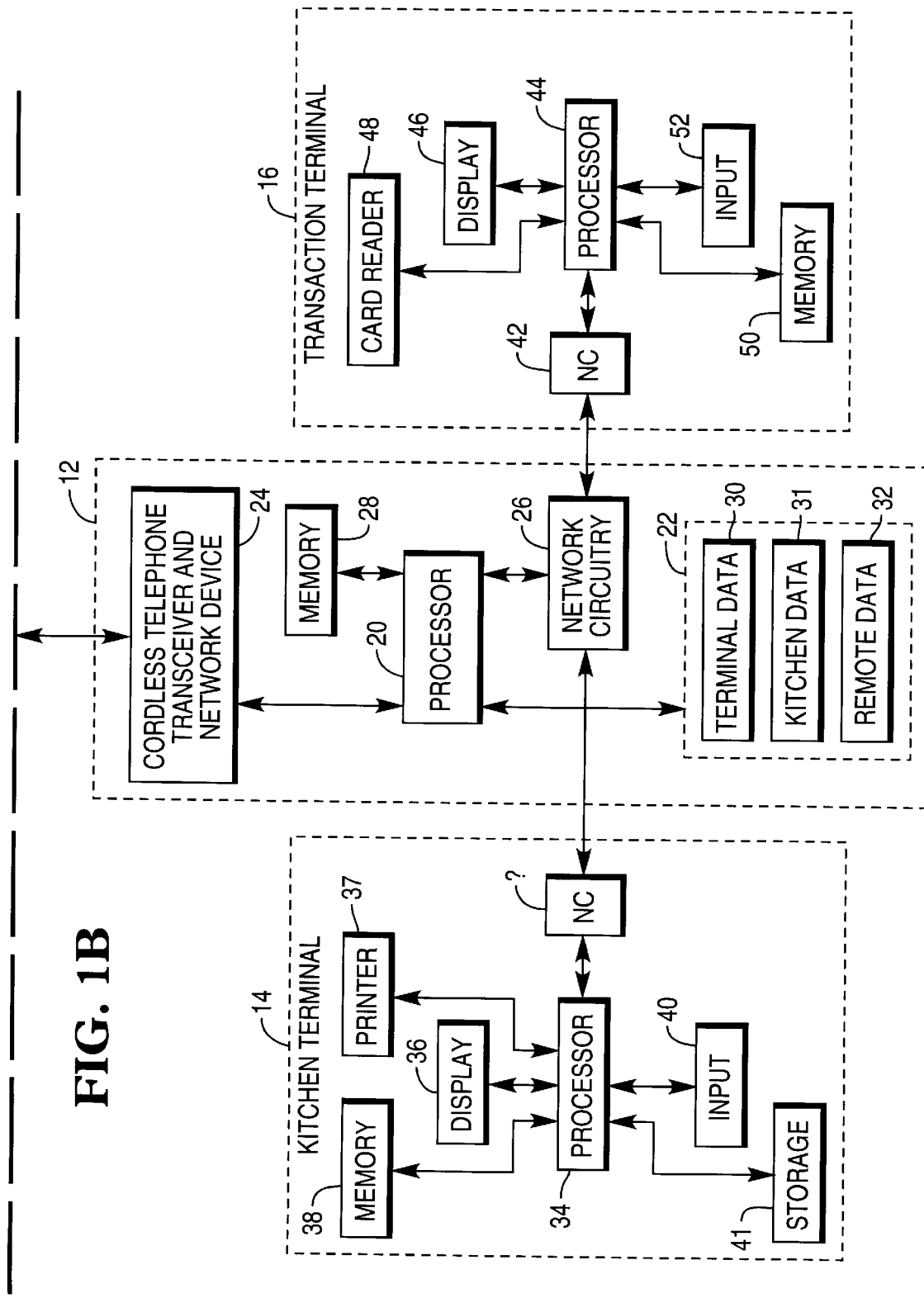

Referring now to FIGS. 1A, 1B, and 2, restaurant transaction processing system 10 includes host computer system 12, kitchen terminal 14, payment terminal 16, and wireless portable order processing device 18.

Host computer system 12 primarily includes processor 20, storage medium 22, cordless telephone transceiver and network device 24, network circuitry 26, and memory 28. Host computer system 12 provides an interface between device 18, kitchen terminal 14, and transaction terminal 16. Host computer system 12 may also maintain transaction information necessary to manage the restaurant, as well as statistics on individuals and their ordering habits.

Storage medium 22 stores transaction data 30 from payment terminal 16, kitchen data 31 from kitchen terminal 14, and remote data 32 from device 18.

Network circuitry 26 allows host computer 14 to network with kitchen terminal 14 and payment terminal 16.

Cordless telephone transceiver and network device 24 allows host computer 12 to network with and wirelessly communicate with device 18. As its name implies, device 24 includes low-cost commercially available cordless phone receiver and transmitter circuitry, and commercially available network adapter circuitry. The cordless telephone transceiver portion is the type commonly found in homes and offices as a replacement for telephones having headsets connected to base units by flexible, yet limited length, telephone cords. The cordless telephone transceiver portion can communicate with another such portion in another computer in the same way that a cordless telephone communicates with its base unit.

Kitchen terminal 14 receives orders from device 18 and sends "order ready" messages back to device 18. Kitchen terminal 14 includes processor 34, display 36, printer 37, memory 38, input device 40, and network circuitry 41.

Display 36 displays order information received from device 18.

Printer 37 prints order information on a check, which is presented to a customer with the order.

Input device 40 is preferably a keyboard or pointing device.

Payment terminal 16 serves to complete the payment process of a transaction and includes network circuitry 42, processor 44, display 46, card reader 48, memory 50, and input device 52.

Card reader reads credit cards, debit cards or SMART cards to complete the payment process.

Input device 52 is preferably a keyboard or pointing device.

Device 18 is preferably a wireless portable computing device 54 (FIG. 2), similar to a portable digital assistant (PDA). Device 18 includes digitizer 56, stylus 58, display 60, memory 62, storage medium 64, processor 66, and cordless telephone transceiver 68.

Device 18 is preferably carried by a restaurant employee who takes orders and serves food. The employee uses stylus 58 and digitizer 56 to record the order. Cordless telephone transceiver 68 transmits the order to kitchen terminal 14. When the order is ready, the cook sends an "order ready" message to the employee.

Cordless telephone transceiver 68 may be built into device 12, or packaged as a PC card 72 which is inserted into PC card controller 74. An antenna 76 is preferably integrated into PC card 72. Antenna 76 may also be remotely located from PC card 72 and attached to PC card 72 through a cable.

Cordless telephone transceiver and network device 24 is shown as an adapter card 78 which is inserted into a bus expansion connector within host computer cabinet 80. An antenna 82 may be coupled directly to adapter card 78 or remotely located from adapter card 78 for better reception and coupled to adapter card 78 through coaxial cable 79.

Cordless telephone transceivers 24 and 68 typically operate at low power. The transmission range for such cordless transceivers is less than five thousand feet.

Cordless telephone transceivers 24 and 68 preferably operate at frequencies designated by the FCC for this type of function or in the Instrumentation, Scientific and Medical (ISM) band or at bands designated as unlicensed bands or in private bands. The transceivers adhere to FCC transmission protocols required for each band. A typical frequency of operation is in a frequency band near 900 MHz.

Figure 3:
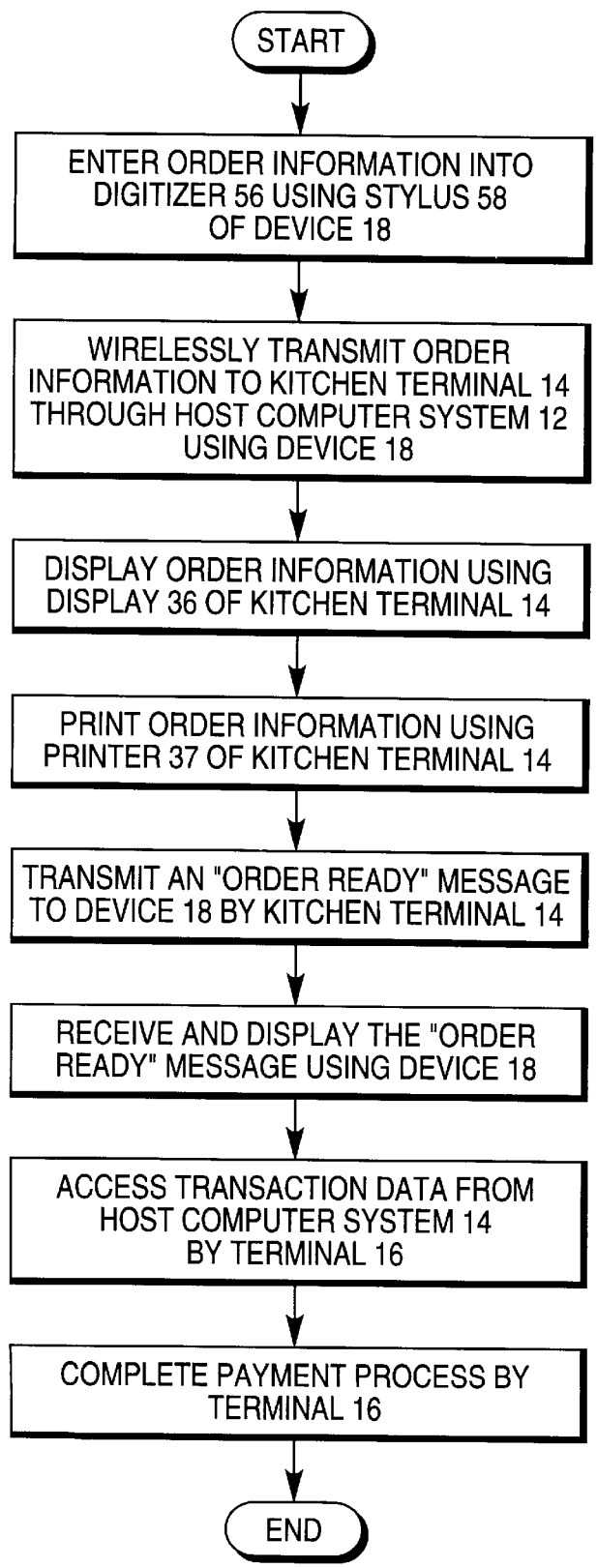
FIG. 3 is flow diagram illustrating the operation of the system in completing a restaurant transaction.

Turning now to FIG. 3, a transaction processing method begins with START 90.

In step 92, a restaurant employee acting as a server, causes device 18 to record order information into digitizer 56 using stylus 58.

In step 94, the restaurant employee causes device 18 to wirelessly transmit the order information to kitchen terminal 14 through host computer system 12. Host computer system 12 stores the transaction data and modifications to the transaction data in storage medium 22.

In step 96, a cook causes display 36 to display the order information at kitchen terminal 14.

In step 98, the cook causes printer 37 to print the order information onto a check.

In step 100, the cook causes terminal 14 to wirelessly transmit an "order ready" message to device 18.

In step 102, device 18 receives and displays the "order ready" message using device 18.

In step 104, another restaurant employee, who is responsible for ensuring payment is received from the customer, causes terminal 16 to access transaction data from host computer system 14.

In step 106, the other employee completes the payment process and closes the transaction data. The other employee may use card reader 48 in accepting payment. Both host computer 12 and device 18 may employ known encryption techniques to secure the data.

The method ends at step 108.

Although the invention has been described with particular reference to certain preferred embodiments thereof, variations and modifications of the present invention can be effected within the spirit and scope of the following claims.

What is claimed is:

1. A restaurant transaction processing system, comprising:
    a portable order processing device having a display and having a digitizer and stylus for input of restaurant order information, the portable order processing device further having a first cordless telephone transceiver for transmitting the order information;
    a host computer system having a second cordless telephone transceiver for receiving the transmitted order information, the host computer system further having network circuitry for establishing a network between the host computer and remote network terminals and having a storage medium for maintaining data from the terminals and from the portable order processing device;
    a kitchen terminal having network circuitry for connecting into the network, the kitchen terminal including a display and printer for, respectively, displaying and printing order information, and including an input for inputting order ready messages to be transmitted back to the portable order processing device; and
    a payment terminal having network circuitry for connecting into the network, the payment terminal completing payment for orders received from the portable order processing device.

2. A restaurant transaction processing system according to claim 1, wherein the first and second cordless telephone transceivers operate at frequencies designated by the FCC.

3. A restaurant transaction processing system according to claim 1, wherein the first and second telephone transceivers have a transmission range less than five thousand feet.

4. A restaurant transaction processing system according to claim 1, wherein the portable order processing device encrypts the data before sending the data to the host computer.

5. A restaurant transaction processing system according to claim 1, wherein the first cordless telephone transceiver is built into the portable order processing device.

6. A restaurant transaction processing system according to claim 1, wherein the portable order processing device has a PCMCIA port, and wherein the first cordless telephone transceiver includes a PCMCIA card which fits within the PCMCIA port.

7. A restaurant transaction processing system according to claim 1, wherein the host computer has a system bus and an expansion connector coupled to the system bus, and wherein the second cordless telephone transceiver includes an adapter card that couples to the expansion connector.

8. A restaurant transaction processing system according to claim 7, wherein the host computer system further includes an antenna coupled directly to the adapter card.

9. A restaurant transaction processing system according to claim 7, wherein the host computer system further includes an antenna remotely located from the adapter card that is coupled to the adapter card through a coaxial cable.

10. A restaurant transaction processing system according to claim 1, wherein the host computer system maintains transaction information necessary to manage the restaurant and statistics on individuals and their ordering habits.

11. A restaurant transaction processing system according to claim 1, wherein the payment terminal includes a card reader for reading credit carts to complete the payment process.

12. A portable order processing device for use in a restaurant transaction processing system, the portable order processing device having a display and having a digitizer and stylus for input of restaurant order information, the portable order processing device further having a first cordless telephone transceiver for transmitting the order information to a host computer system having a second cordless telephone transceiver for receiving the transmitted order information, the host computer system further having network circuitry for establishing a network between the host computer and remote kitchen and payment terminals and having a storage medium for maintaining data from the terminals and from the portable order processing device, the kitchen terminal having network circuitry for connecting into the network, the kitchen terminal including a display and printer for, respectively, displaying and printing order information, and including an input for inputting order ready messages to be transmitted back to the portable order processing device, and the payment terminal having network circuitry for connecting into the network, the payment terminal completing payment for orders received from the portable order processing device.

13. A method for completing a restaurant transaction comprising the steps of:

providing a host computer having a first cordless telephone transceiver;

providing a kitchen terminal, which is coupled to the host computer through a network;

providing a payment terminal, which is coupled to the host computer through the network;

providing a portable order processing device having a second cordless telephone transceiver, the portable order processing device having a display and having a digitizer and stylus for input of restaurant order information;

recording an order by the portable order processing device digitizer and stylus;

transmitting the order to the host computer by the second cordless telephone transceiver;

receiving the order by the first cordless telephone transceiver;

generating an order ready signal by the kitchen terminal;

transmitting the order ready signal to the portable order processing device by the host computer;

receiving and displaying the order ready signal by the portable order processing device;

accessing the order by the payment terminal; and recording payment for the order by the payment terminal.

* * * * *